United States Patent
Wilson, Jr.

(10) Patent No.: US 6,256,322 B1
(45) Date of Patent: Jul. 3, 2001

(54) BUNDLING MULTIPLE NETWORK MANAGEMENT PACKETS

(75) Inventor: Richard Alexander Wilson, Jr., Cota De Caza, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/165,114

(22) Filed: Oct. 2, 1998

(51) Int. Cl.[7] .............................. H04J 3/16; H04J 3/22; G06F 15/16
(52) U.S. Cl. .................................. 370/469; 709/228
(58) Field of Search .......................... 370/389, 395, 370/396, 397, 400, 401, 469, 537; 709/230, 237, 228

(56) References Cited

U.S. PATENT DOCUMENTS

| | | | |
|---|---|---|---|
| 4,855,905 | 8/1989 | Estrada et al. | 709/246 |
| 5,182,748 | 1/1993 | Sakata et al. | 370/466 |
| 5,305,317 | 4/1994 | Szczepanek | 370/469 |
| 5,321,819 | 6/1994 | Szczepanek | 709/228 |
| 5,323,392 | 6/1994 | Ishii et al. | 370/466 |
| 5,408,609 | 4/1995 | Malgogne et al. | 709/228 |
| 5,410,535 | 4/1995 | Yang et al. | 713/1 |
| 5,425,028 | 6/1995 | Britton et al. | 370/389 |
| 5,430,727 | 7/1995 | Callon | 370/401 |
| 5,491,693 | 2/1996 | Britton et al. | 370/401 |
| 5,491,694 | 2/1996 | Oliver et al. | 370/455 |
| 5,509,123 | 4/1996 | Dobbins et al. | 709/243 |
| 5,526,489 | 6/1996 | Nilakantan et al. | 709/228 |
| 5,699,350 * | 12/1997 | Kraslavsky | 370/254 |
| 5,710,908 | 1/1998 | Man | 709/230 |
| 5,721,818 * | 2/1998 | Hanif et al. | 709/228 |
| 6,055,240 * | 4/2000 | Tunnicliffe | 370/428 |

OTHER PUBLICATIONS

SK–Passport User's Manual, Syskonnect, Inc., Saratoga, CA, 1992.

* cited by examiner

*Primary Examiner*—Huy D. Vu
*Assistant Examiner*—Kevin C. Harper
(74) *Attorney, Agent, or Firm*—Fitzpatrick, Cella, Harper & Scinto

(57) ABSTRACT

Management of a network device by a management client over a network using a network management protocol such as SNMP or DMI, with the managed device including multiple different protocol stacks for receiving network transmissions using multiple different protocols respectively corresponding to the multiple different protocol stacks. The management client obtains information from the managed device pertaining to the presence and identity of the multiple different protocol stacks. Thereafter, to manage the managed device, the management client sends multiple copies of the same network management packet to the same recipient over each of the different protocol stacks. If a single managed device includes plural different network interfaces, then multiple transmissions are also made to each different network interface. By virtue of this arrangement, since multiple copies of the same network management packet are sent to the same recipient, reliability of receipt of the management packet is increased.

23 Claims, 7 Drawing Sheets

| DEVICE IDENTIFIER | OPERATIVE PROTOCOL STACKS |
|---|---|
| PRINTER 102 | IPX UDP |
| SCANNER 104 | AppleTalk NetBIOS |
| MULTIFUNCTION DEVICE 118 | IPX IP DDP |
| ... | ... |
| PRINTER 116 | DDP NetBIOS |
| PRINTER 116 | IPX IP |
| ... | ... |

FIG. 5

BUNDLING MULTIPLE NETWORK MANAGEMENT PACKETS

BACKGROUND OF THE INVENTION

1. Field of the Invention

The present invention relates to management of network devices from a management client over a local or wide area network, by utilizing a network management protocol such as simplified network management protocol (SNMP) or desktop management interface (DMI). In particular, the invention relates to bundling of multiple network management packets for transmission to the same network device, but over different protocol stacks, so as to increase reliability of receipt by the managed network device of the management packet.

2. Description of the Related Art

Network management protocols such as simplified network management protocol (SNMP) and desktop management interface (DMI) have become industry-wide de-facto standard for managing network devices over a local or wide area network. According to these protocols, a management client sends network management packets to a targeted network device, so as to manage and to obtain configuration of the managed network device. Thus, it is possible for the management client to set and alter configuration of the managed device, to set and alter network settings for the managed device, and to obtain information about configuration and status of the managed device, all through transmission of appropriate network management packets over the network.

One problem encountered in management of network devices using such network management protocols is the possibility that the managed device might not ever receive the network management packet transmitted by the management client. This problem is amplified as networks become more complex and more heterogeneous (meaning that more and different network protocols are operating on the same physical network wire), thereby increasing overall network traffic. Especially in situations involving wide area networks, therefore, where the managed device is located remotely through many routers and repeaters from the management client, it is possible for the network management packet never to reach the managed device.

SUMMARY OF THE INVENTION

It is an object of the invention to address the foregoing by sending multiple copies of the same network management packet to the same managed device, but using different protocols for each of the copies so as to increase reliability of receipt.

Specifically, managed devices interface to the network through a network interface card (NIC), which typically is provided with multiple protocol stacks such as TCP/IP SPX/IPX, DDP, DDP/UDP, NetBIOS/NetBUI, AppleTalk, and the like. Each of these different protocol stacks is provided in the NIC so as to permit the managed device to communicate with various clients using different protocols. Thus, it is advantageous to provide a managed device with a NIC having multiple different protocol stacks, so as to increase the flexibility and usability of the device.

The invention is premised on the inventor's recognition that each of these different protocol stacks is also available for use during transmission of network management packets, and is further premised on the inventor's recognition that receipt by the managed device of multiple copies of the same network management packet is not harmful to the managed device. Specifically, since each copy of the management packet would merely set the managed device into the same configuration, or cause the managed device to send multiple copies of its status to the management client, there is no practical disadvantage for the managed device to receive the same packet more than once.

Thus, in one aspect, the invention is management of a network device by a management client over a network using a network management protocol, with the managed device including a network interface card having multiple different protocol stacks for receiving network transmissions using multiple different protocols respectively corresponding to the multiple different protocol stacks. According to the invention, the management client obtains information from the managed device pertaining to the presence and identity of the multiple different protocol stacks. Thereafter, to manage the managed device, the management client sends multiple copies of the same network management packet to the same recipient over each of the different protocol stacks so obtained.

By virtue of this arrangement, since multiple copies of the same network management packet are sent to the same recipient, reliability of receipt of the management packet is increased.

In a related aspect, it is possible that some network devices are provided with more than one network interface card (NIC) so as to permit the managed device to operate on two or more (often physically dissimilar) networks. For example, one network printer might be provided with two NIC's, the first for interface to a token ring network and the second for interface to an Ethernet network. Such network devices are sometimes referred to as "dual home" devices, since the same device appears twice on the network. In such situations, the invention provides for transmission not only of multiple copies of the same network management packet to the same recipient, but also provides for transmission of such multiple copies to each and every NIC in the managed device.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 5 shows one representative configuration for a table of devices and corresponding protocol stacks.

DETAILED DESCRIPTION OF THE PREFERRED EMBODIMENT

Figure 1:
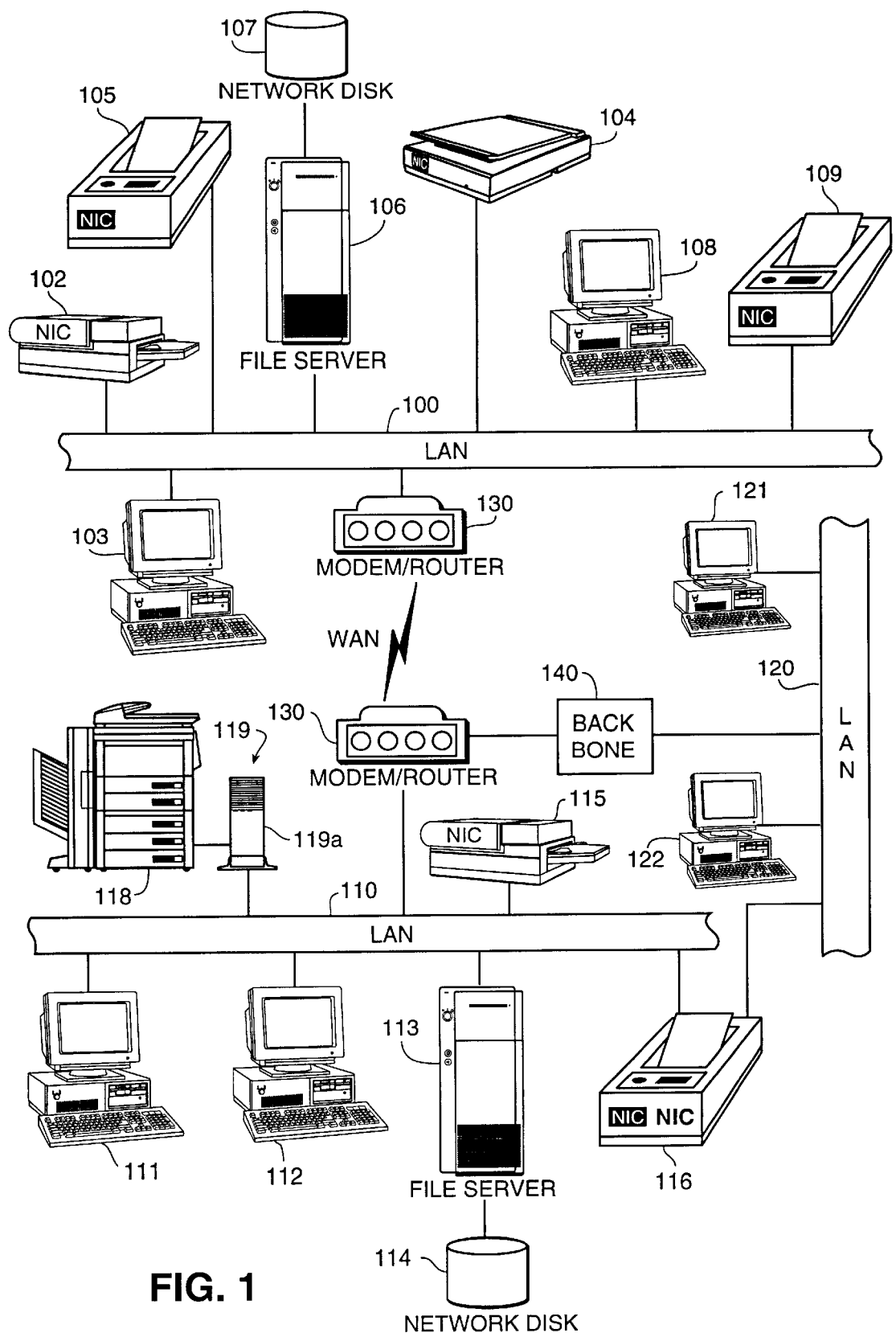
FIG. 1 is a topological view of a representative wide area network to which the present invention may be applied.

FIG. 1 is a topological view of a representative wide area network to which the present invention may be applied.

Shown in FIG. 1 are three separate local area networks (LAN's) 100, 110 and 120, connected to each other through modems 130 and backbone 140 into an overall wide area network (WAN). Each of LAN's 100, 110 and 120 may be configured physically into any of the known network configurations such as Ethernet or Token Ring, and each LAN may carry network transmissions using one or more network protocols over one or more frame types. Because of the diversity of protocols and frame types, the wide area network of FIG. 1 is often referred to as a "heterogeneous" network.

For purposes of explanation, it is assumed that at least some of the LAN's are physically dissimilar; accordingly, in this representative embodiment, LAN's 100 and 110 are configured as Ethernet networks while LAN 120 is configured as a Token Ring network.

Connected to each of the LAN's are plural workstations and plural networked devices. For example, connected to LAN 100 are workstations 103 and 108, together with networked devices including printer 102, scanner 104, and printers 105 and 109. Also connected to LAN 100 is file server 106 which manages access to files stored on large capacity network disk 107. Other unshown networked devices and workstations may also be connected to LAN 100.

Connected to LAN 110 are workstations 111 and 112, and networked devices including printers 115 and 116 and multi-function (print, scan and fax) device 118. (Actually, multi-function device 118 is connected to LAN 110 through a network interface 119, as explained more fully below.) LAN 110 also includes file server 113 which manages access to large capacity network disk 114.

Connected to LAN 120 are workstations 121 and 122, as well as networked devices such as printer 116.

One or more of the workstations on the WAN, such as workstation 103, may be designated for use as a network administrator; or the network administrator may log on to the network from any of the workstations using proper password identification. For simplicity of explanation, it will be assumed that workstation 103 is the administrator's workstation.

Each of the networked devices includes a network interface such as a network interface card ("NIC") or a stand-alone network interface. The function of the network interface is to receive and to send network transmissions to and from the networked device. For example, in the case of printer 102 which includes a NIC, the function of the NIC is to receive print jobs from LAN 100, such as a print job from a print queue in file server 106. Likewise, another function of the NIC for printer 102 is to send transmissions from printer 102 to LAN 100, such as transmissions which poll for the presence of print jobs in the print queue. Such transmissions of the network interface will hereinafter be referred to as "device-specific" transmissions, since they relate to the purpose of the networked device.

Another function of the network interface is to send and receive network transmissions concerning management of the networked device and of the network interface itself. For example, the NIC for printer 102 sends and receives management transmissions over a network management protocol such as simple network management protocol (SNMP) or desktop management interface (DMI) concerning configuration and status of printer 102 and of the NIC itself. Such transmissions will hereinafter be referred to as "network management" transmissions, since they relate to management of the networked device or of the network interface for the networked device.

Each networked device on the WAN includes some network interface. For example, printers 102, 105, 109 and 115 each include a single NIC. Scanner 104 includes a single NIC. Multi-function device 118 includes stand-alone network interface 119 which includes a multi-function controller 119a. Finally, printer 116 includes multiple network interfaces, here, two different NICs, for connection to both of LAN 110 and LAN 120. Because printer 116 includes more than one network interface, printer 116 is able to operate on more than one network and in this case the two networks are physically dissimilar (LAN 110 being Ethernet and LAN 120 being Token Ring). Printer 116 is sometimes referred to as a "dual home" networked device, since the same network device appears twice on the overall WAN.

Figure 2:
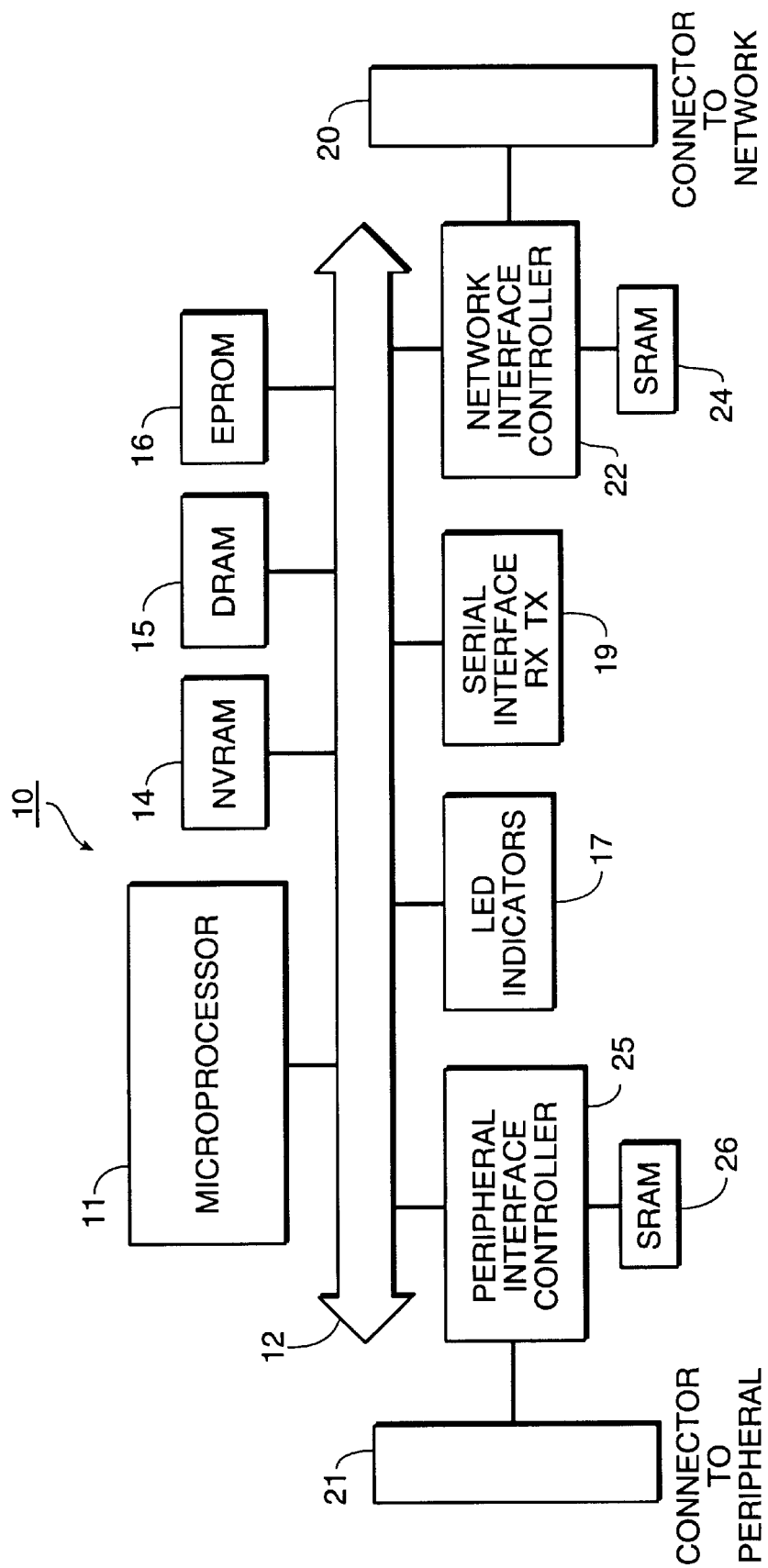
FIG. 2 is a block diagram of a representative network interface.

FIG. 2 is a block diagram of a representative network interface, such as a network interface card, for interfacing a networked device to a network. As shown in FIG. 2, the network interface includes central processing unit (CPU) 11 such as an Intel 80188 8-bit programmable microprocessor which is interfaced to computer bus 12. Also interfaced to computer bus 12 are nonvolatile RAM (NVRAM) 14, dynamic RAM (DRAM) 15, electrically erasable programmable read only memory (EEPROM) 16, drivers for LED indicators 17, and serial interface 19 which includes both a transmit and a receive terminal. Configuration parameters and other important information concerning the configuration of the network interface are ordinarily stored in NVRAM 14, where such information may be stored between power cycles. Process steps for execution by microprocessor 11 are stored in EEPROM 16, but in general, before those process steps are executed, they are copied from EEPROM 16 into DRAM 15 for execution out of DRAM 15. LED indicators 17 are provided so as to give a user a general indication as to the processing status of the network interface, and may include, for example, indicator LEDs for power and data communication. Serial interface 19 is provided so as to allow local serial access to the network interface.

As mentioned previously, the interface is between the local area network and the networked device, and is therefore usually provided with a connector 20 for connecting to the LAN as well as a connector 21 for connecting to the networked device. A network interface controller 22 which is connected to bus 12 and to network connector 20, provides hardware interface for capturing and assembling network transmissions received by the network interface and transmitted onto the LAN. Static RAM (SRAM) 24 is provided for network interface controller 22 so as to store, on a temporary basis, such network transmissions.

On the peripheral side, peripheral interface controller 25, which is connected to bus 12 and peripheral connector 21, provides peripheral interface between the network interface and the networked device serviced by the network interface. Peripheral controller 25 may be of any of a variety of different controllers, and can, for example, be constructed for a bi-directional interface (such as a SCSI interface, an IEEE 1284 interface, a dual port RAM interface, a shared RAM interface, and the like) or a uni-directional interface (such as a standard Centronix RS-232 interface or the like). Peripheral interface controller 25 is provided with SRAM 26 for temporary storage of data transmitted between the network interface and the networked device.

Figure 3:
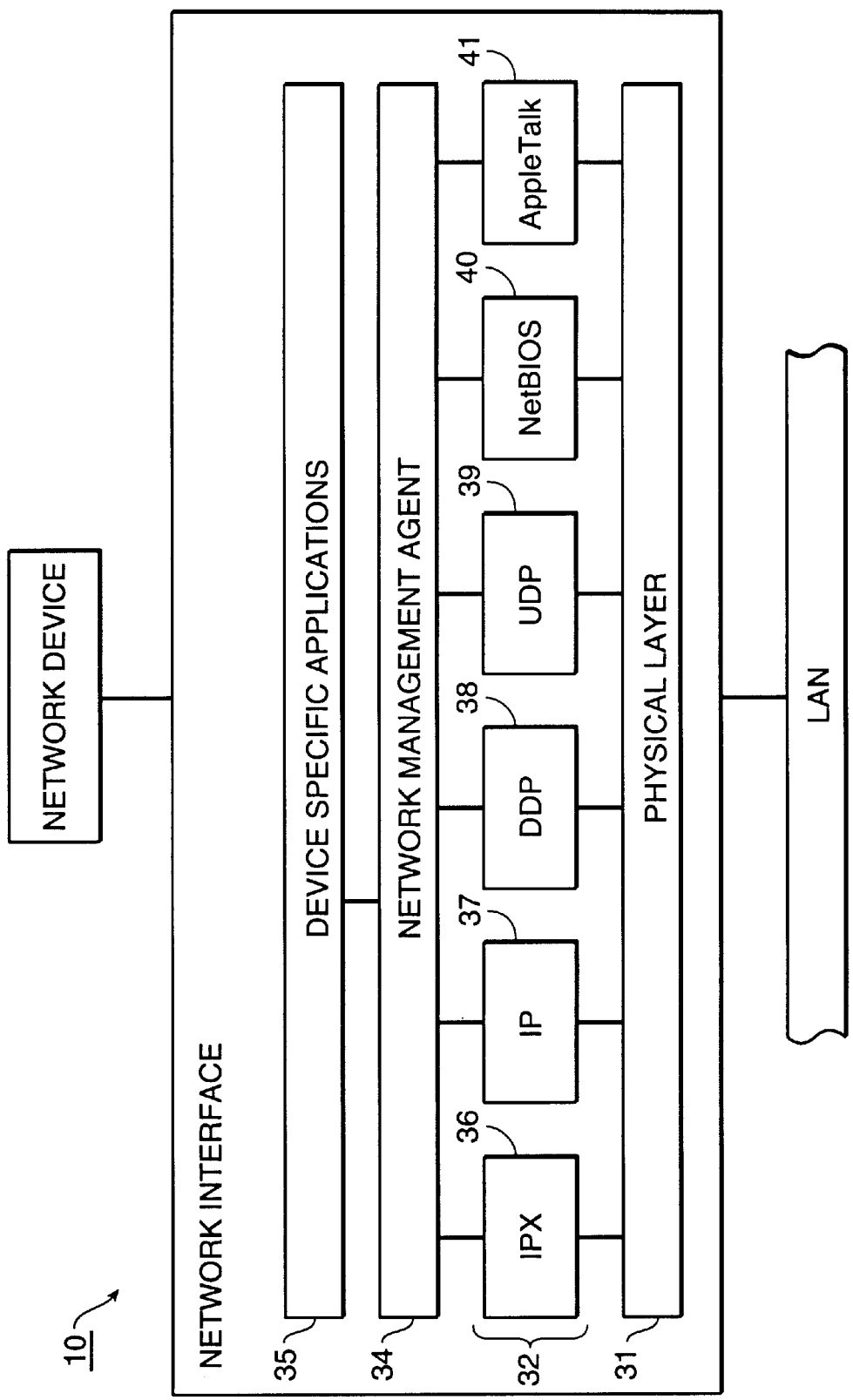
FIG. 3 illustrates the architecture of software used in the network interface.

FIG. 3 illustrates the architecture of software in the network interface. Such software is stored as computer-executable process steps in a computer readable medium, such as the aforementioned EEPROM 16. As shown in FIG. 3, the architecture of the software extends through network interface 10 between the LAN and the networked device, so as to provide interface for the networked device to the LAN. Thus, the architecture of the software includes physical layer 31, plurality of different protocol stacks 32, network management agent 34, and device-specific applications 35. Device-specific applications 35 are applications concerning the functionality of the network device, such as print server applications for a printer, scanning applications for a scanner, and facsimile applications for a facsimile device. Network management agent 34 is a software application that provides management functionality for the network interface and for the networked device. In a preferred embodiment, network management agent 34 is comprised by a simplified management network protocol (SNMP) management agent by which the network interface and the networked device are both managed using a pre-arranged protocol. Other management agents may also be used, such as desktop management interface (DMI).

Plural protocol stacks 32 allow the networked device to communicate via the network interface on the LAN using plural different network protocols. In the FIG. 3 example, six different network protocol stacks are shown, including IPX protocol stack 36, IP protocol stack 37, DDP protocol stack 38, UDP protocol stack 39, NetBIOS protocol stack 40 and AppleTalk protocol stack 41. Other protocol stacks may also be provided, and not all the protocol stacks shown in FIG. 3 need to be provided; according to the invention, however, two or more protocol stacks are needed for any one networked device.

Figure 4:
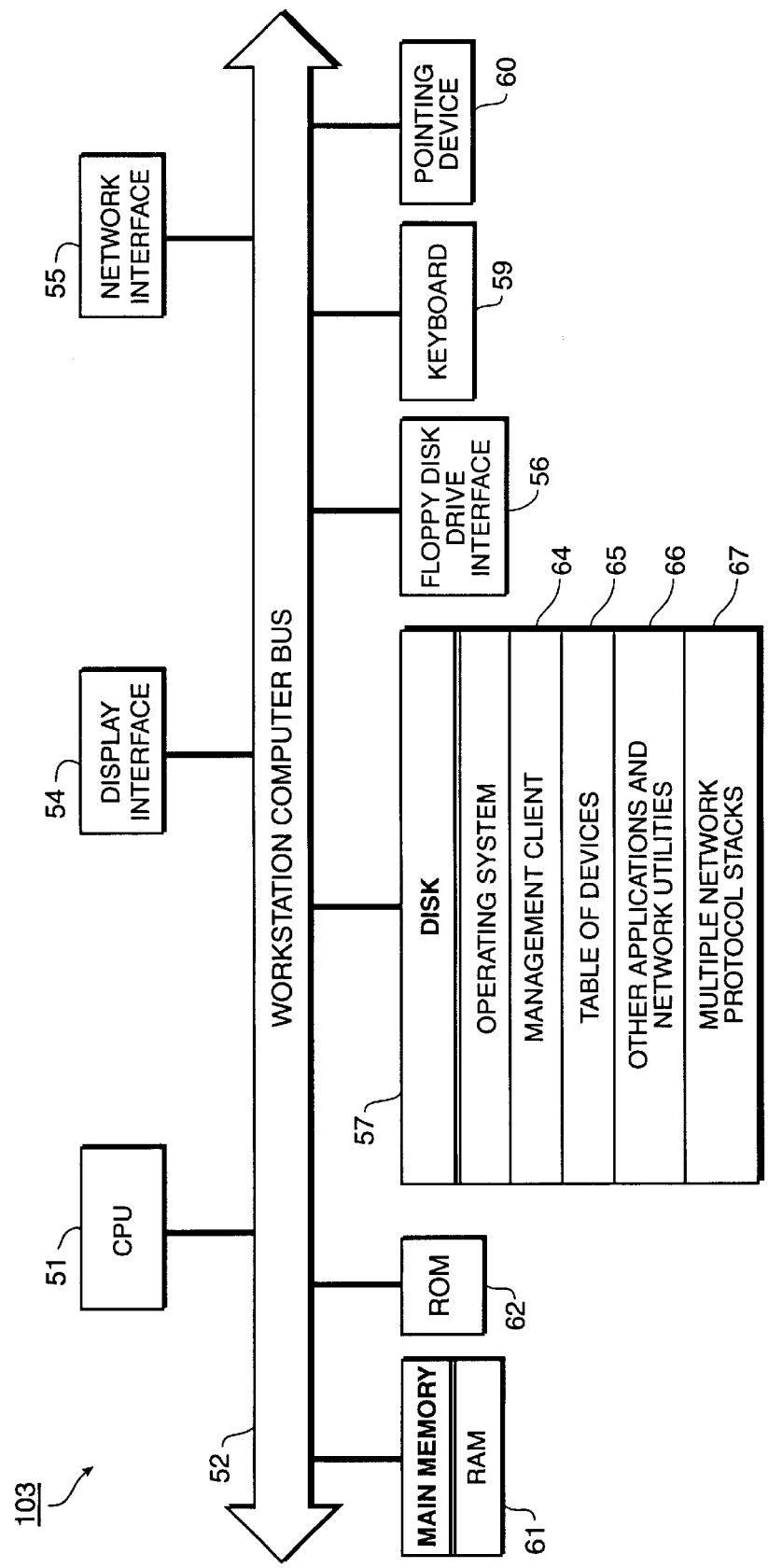
FIG. 4 is a block diagram showing a generalized structure of a workstation connected to the LAN.

FIG. 4 is a block diagram showing a generalized structure of a workstation connected to the LAN, and particularly shows the structure of the administrator's workstation 103. Thus, as shown in FIG. 4, workstation 103 includes a central processing unit 51 such as an Intel Pentium processor, interfaced to a workstation computer bus 52. Also interfaced to the workstation computer bus 52 is display interface 54, network interface 55 for interfacing to the local area network, floppy disk drive interface 56 by which software including process steps according to the invention may be installed to hard disk drive 57, keyboard 59, and pointing device 60 such as a mouse or the like.

Main memory 61 including random access memory (RAM) interfaces to computer bus 52 so as to provide CPU 51 with access to memory storage. In particular, when executing stored program instruction sequences such as instruction sequences according to the invention, CPU 51 loads those instruction sequences from disk 57 (or other computer readable storage media) into main memory 61 and executes those stored program instruction sequences out of main memory. Of course, in dependence upon the particular operating system provided for workstation 103, disk swapping techniques may be employed so as to increase the amount of virtual memory available to CPU 51.

ROM 62 is provided for storing invariant instruction sequences such as start-up instruction sequences for BIOS and operation of keyboard 59 and the like.

As shown in FIG. 4, and as previously mentioned, fixed disk 57 stores program instruction sequences for an operating system, such as a windowing or a DOS operating system, and for various unshown application programs. In addition, fixed disk 57 also stores a management client 64, a table of device characteristics 65, other applications and network utilities 66, and multiple network protocol stacks 67. The multiple network protocol stacks 67 include protocol stacks for each of the different network protocols which administrator's workstation 103 needs to communicate with each of the networked devices. Thus, it is preferred that the multiple protocol stack 67 stored at the administrator's workstation 103 include as many protocol stacks as possible, so as to increase the diversity of networked devices that might be managed. For example, in preferred forms, protocol stacks included at the administrator's workstation 103 include IPX, IP, DDP, UDP, NetBIOS and AppleTalk.

The table of devices 65 stores a list of managed devices that are managed by management client 64 in administrator's workstation 103. Included with the list of devices is a list of operative protocol stacks for each device. The operative protocol stacks for each device are obtained by management client 64 through a sequence of management queries of each device, which is described more fully below.

FIG. 5 shows one representative configuration for table of devices 65. As shown in FIG. 5, table of devices 65 includes a device identifier and, for each device identifier, a list of operative protocol stacks. Thus, as shown in FIG. 5, printer 102 may include operative protocol stacks including an IPX protocol stack and a UDP protocol stack. Likewise, multi-function device 118 might include an IPX protocol stack, an IP protocol stack and a DDP protocol stack.

Printer 116, which includes two separate network interfaces and is consequently a "dual home" device, appears twice in the table. The first entry in the table, corresponding to a first network interface, indicates that the first interface supports a DDP protocol stack and a NetBIOS protocol stack. Likewise, the second entry in table 65 indicates that the second network interface for printer 116 supports an IPX protocol stack and an IP protocol stack.

Figure 6:
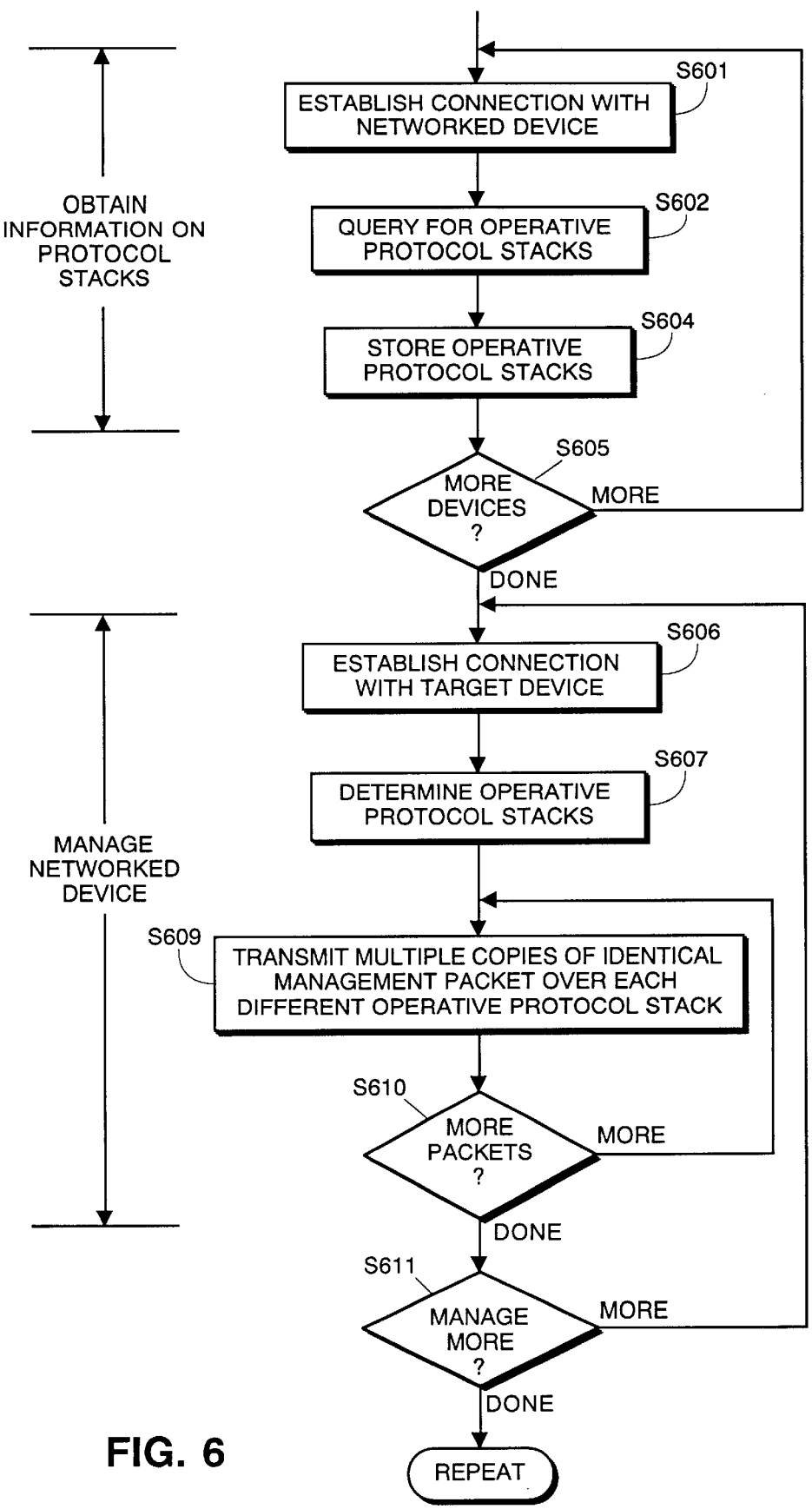
FIG. 6 is a flow diagram showing computer executable process steps for managing a networked device through transmission of multiple copies of the same network management packet over plural different network protocols.

FIG. 6 is a flow diagram showing computer executable process steps executed by management client 65 in workstation 103, so as to manage a networked device through transmission of multiple copies of the same network management packet over plural different network protocols. The process steps shown in FIG. 6 are stored on a computer readable medium which in this case is fixed disk 57.

Briefly, according to the process steps shown in FIG. 6, to manage a networked device using a network management protocol where the managed device includes multiple different protocol stacks for receiving network transmissions using multiple different protocols respectively corresponding to the multiple different protocol stacks, information concerning the presence and identity of the multiple different protocol stacks is obtained from the managed device, and multiple copies of the same network management packet are transmitted to the same managed device over each of the different protocol stacks.

In more detail, steps S601 through S604 obtain information on operative protocol stacks from each networked device for which management is desired, and stores such information in table 65. Thus, step S601 establishes a connection with a networked device for which management is desired, and step S602 queries the networked device for its operative protocol stacks. The query in step S602 is preferably made in accordance with a network management protocol such as SNMP or DMI, and is thus responded to at the networked device via network management agent 34, as described below in connection with FIG. 7.

In step S604, when management client 64 obtains information concerning the presence and identity of the operative protocol stacks in the networked device, such information is stored in table 65. Flow thereupon advances to step S605, which determines whether information for more devices is needed.

Steps S606 through S609 operate to transmit multiple copies of the same network management packet to the same managed device over each of the different operative protocol stacks in the managed device. Thus, in step S606, management client 64 establishes a network connection with the target networked device. Step S607 determines the operative protocol stacks for the target device. Preferably, step S607 is performed in accordance with information in table 65, but is also possible for step S607 to be performed dynamically. For example, step S605 might determine the operative protocol stacks in the targeted device by querying the targeted device for its operative protocol stacks, much like step S602.

In step S609, management client 64 transmits multiple copies of the same management packet, with each copy corresponding to a different one of the operative protocol stacks. Preferably, step S609 is performed by transmitting the multiple copies by a network management protocol such as SNMP or DMI with such management packets being responded to by management agent 34 as described more fully below in connection with FIG. 7.

For dual home networked devices, or any other managed device having more than one network interface, step S609 is repeated for each different network interface. Thus, for example, with respect to printer 116, step S609 is performed a first time to transmit multiple copies of the same management packet using the DDP protocol stack and the NetBIOS protocol stack to the printer's first NIC, and is performed a second time by transmitting multiple copies of the same management packet according to the IPX protocol stack and the IP protocol stack, corresponding to the protocol stacks for the printer's second NIC.

Step S610 determines whether further management of the target device is needed. If further management is needed, then flow returns to step S609 to transmit multiple copies of the next management packet to the target device, with each of the multiple copies corresponding to each different operative protocol stack in the managed device.

Step S611 determines whether management of other target devices is desired, with flow returning to step S606 if further management is desired.

Figure 7:
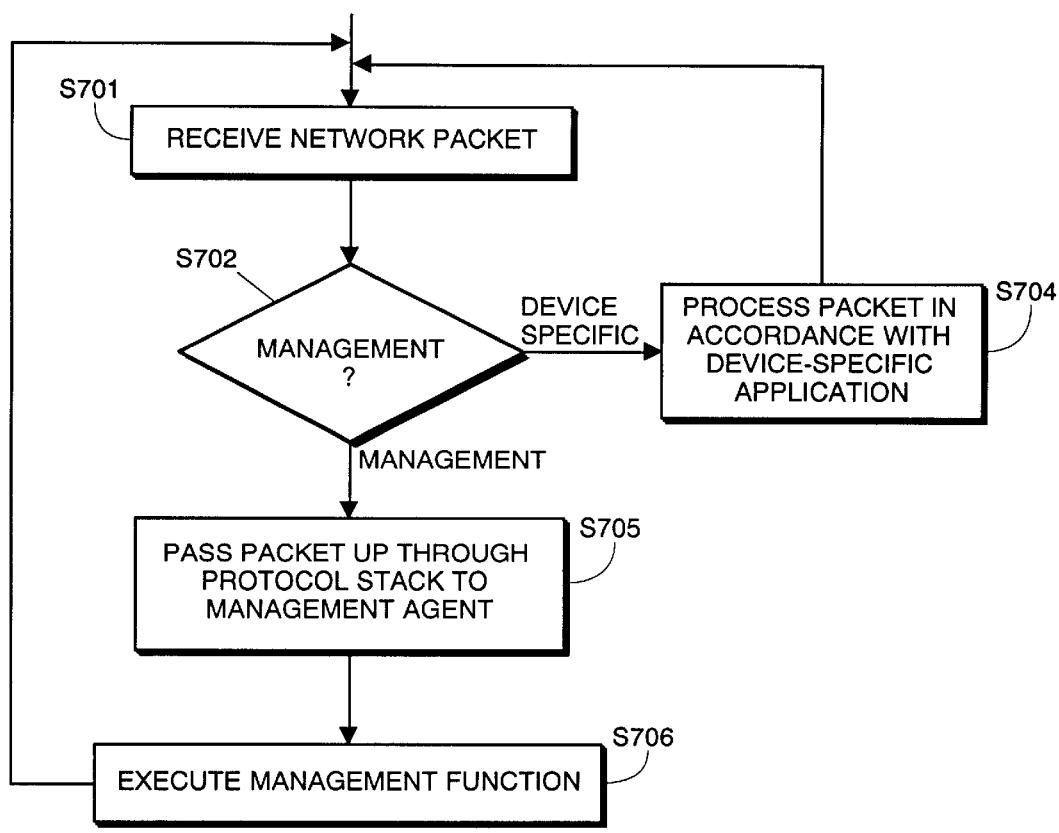
FIG. 7 is a flow diagram showing process steps performed by the network interface of a managed device.

FIG. 7 is a flow diagram showing process steps performed by the network interface of a managed device. The process steps shown in FIG. 7 are stored on a computer readable medium such as EEPROM 16 in network interface 10.

Briefly, according to the flow diagram of FIG. 7, network management packets are received at the network interface and passed up through an appropriate protocol stack (that is, the protocol stack that corresponds to the format of the management packet) to the network management agent which executes the management function.

More specifically, in step S701, the network interface receives a network packet. Step S702 determines whether the packet is a network management packet or some other packet such as a device-specific packet. If the network packet is not a management packet, then flow branches to step S704 which processes the packet such as processing in accordance with device-specific application 35.

On the other hand, if the packet is a network management packet, then flow advances to step S705 which passes the management packet up through the appropriate protocol stack to management agent 34. Management agent 34 processes the packet so as to execute the management function (step S706). For example, the management function might pertain to setting or altering the configuration of the network interface, or might pertain to setting or altering the configuration of the networked device. Alternatively, the network management packet might pertain to a query of the status and configuration of the network interface or the managed device, in which case management agent 34 responds to the query with the appropriate status and configuration information.

In any event, following execution of the management function in step S706, flow returns to step S701 in preparation for receipt of further network packets. In accordance with the invention, the next received packet is most likely a further transmission of the same management packet, but this time with a different protocol corresponding to a second one of the multiple protocol stacks in the network interface. Upon receipt of such a packet, flow ultimately advances to step S706 so as to execute the management function indicated by the packet. Of course, since the received packet is the same as the prior packet, and only differs because it was sent through a different protocol stack, the exact same management function will be re-executed. However, since management functions pertain generally only to setting and querying status and configuration information (of either the network interface or the managed device), such re-execution will not ordinarily harm the managed device since it will result in a re-set to a desired configuration that the device is already in, or will result in a re-send of status and configuration information such that the management client receives such information more than once. Rather than being disadvantages, however, such re-execution is considered one of the advantages of the invention, since such re-execution increases the reliability of management over the networked device.

It is emphasized that several changes may be applied on the above-described system without departing from the teaching of the invention. It is intended that all the matter contained in the present disclosure, or shown in the accompanying drawings, shall be interpreted as illustrative rather than limiting.

What is claimed is:

1. A method for managing a networked device by a management client over a network using a network management protocol, with the managed device including a network interface having multiple different protocol stacks for receiving network transmissions using multiple different protocols respectively corresponding to the multiple different protocol stacks, the method comprising the steps of:

obtaining information from the managed device pertaining to the presence and identity of the multiple different protocol stacks; and transmitting multiple copies of a same network management packet to the same managed device over each of the multiple different protocol stacks.

2. A method according to claim 1, further comprising the steps of determining whether the managed device includes multiple different network interfaces, and transmitting multiple copies of the same network management packet to each of the multiple network interfaces in the same managed device, wherein said step of obtaining information includes the steps of obtaining such information from each of the multiple different network interfaces in the same managed device.

3. An apparatus for managing a networked device by a management client over a network using a network management protocol, with the managed device including a network interface having multiple different protocol stacks for receiving network transmissions using multiple different protocols respectively corresponding to the multiple different protocol stacks, said apparatus comprising means for performing the functions specified in claim 1 or 2.

4. An apparatus for managing a networked device by a management client over a network using a network management protocol, with the managed device including a network interface having multiple different protocol stacks for receiving network transmissions using multiple different protocols respectively corresponding to the multiple different protocol stacks, comprising:

a program memory for storing process steps executable to perform a method according to claim 1 or 2; and a processor for executing the process steps stored in said program memory.

5. Computer-executable process steps stored on a computer readable medium, said computer-executable process steps for managing a networked device by a management client over a network using a network management protocol, with the managed device including a network interface having multiple different protocol stacks for receiving network transmissions using multiple different protocols respectively corresponding to the multiple different protocol stacks, said computer-executable process steps comprising process steps executable to perform a method according to claim 1 or 2.

6. A method of a management client for obtaining protocol stack information of a networked device including a network interface having multiple different protocol stacks for receiving network transmissions using multiple different protocols respectively corresponding to the multiple different protocol stacks, the method comprising the steps of:

establishing a connection with networked device;

determining whether to query the device or to access a stored table of information corresponding to the networked device to obtain information pertaining to operative protocol stacks included in the network device;

querying the networked device over the connection to obtain information pertaining to the operative protocol stacks included in the networked device in a case that it is determined to query the device; and obtaining the information pertaining to the operative protocol stacks included in the networked device from the stored table in a case that it is determined to access the stored table.

7. A method according to claim 6, further comprising determining whether the stored table is accessible and for outputting a determination result, wherein the determination of whether to query the device or to access the stored table is based on the determination result.

8. An apparatus for obtaining protocol stack information of a networked device including a network interface having multiple different protocol stacks for receiving network transmissions using multiple different protocols respectively corresponding to the multiple different protocol stacks, said apparatus comprising means for performing the functions specified in claim 6 or 7.

9. An apparatus for obtaining protocol stack information of a networked device including a network interface having multiple different protocol stacks for receiving network transmissions using multiple different protocols respectively corresponding to the multiple different protocol stacks, comprising:

a program memory for storing process steps executable to perform a method according to claim 6 or 7; and a processor for executing the process steps stored in said program memory.

10. Computer-executable process steps stored on a computer readable medium, said computer executable process steps to obtain protocol stack information of a networked device including a network interface having multiple different protocol stacks for receiving network transmissions using multiple different protocols respectively corresponding to the multiple different protocol stacks, said computer-executable process steps comprising process steps executable to perform a method according to claim 6 or 7.

11. A method for a networked device including a network interface, a management agent to manage the networked device in response to a network management packet specifying one or more management functions, and multiple different protocol stacks for receiving network transmissions using multiple different protocols respectively corresponding to the multiple different protocol stacks, the method comprising:

receiving a first copy of a network management packet following a first protocol corresponding to one of the multiple different protocol stacks;

passing the received first copy of the packet to the corresponding one of the multiple different protocol stacks and thereafter to the management agent;

processing the received first copy of the packet to execute a management function specified by the received first copy of the packet;

receiving a second copy of the packet following a second protocol corresponding to a second one of the multiple different protocol stacks;

passing the received second copy of the packet to the corresponding second one of the multiple different protocol stacks and thereafter to the management agent; and processing the received second copy of the packet to execute the same management function.

12. The method according to claim 11, further comprising determining whether the received packet is a device-specific packet or a network management packet.

13. The method according to claim 12, wherein, if the received packet is a device specific packet, a device specific application corresponding to the packet is executed.

14. An apparatus for a networked device including a network interface, a management agent to manage the networked device in response to a network management packet specifying one or more management functions, and multiple different protocol stacks for receiving network transmissions using multiple different protocols respectively corresponding to the multiple different protocol stacks, said apparatus comprising means for performing the functions specified in any one of claims 11 to 13.

15. An apparatus for a networked device including a network interface, a management agent to manage the networked device in response to a network management packet specifying one or more management functions, and multiple different protocol stacks for receiving network transmissions using multiple different protocols respectively corresponding to the multiple different protocol stacks, comprising:

a program memory for storing process steps executable to perform a method according to any of claims 11 to 13; and a processor for executing the process steps stored in said memory.

16. Computer-executable process steps stored on a computer readable medium, said computer-executable process steps for a networked device including a network interface, a management agent to manage the networked device in response to a network management packet specifying one or more management functions, and multiple different protocol stacks for receiving network transmissions using multiple different protocols respectively corresponding to the multiple different protocol stacks, said computer-executable process steps comprising the process steps executable to perform a method according to any of claims 11 to 13.

17. A method for managing a networked device by a management client over a network using a network management protocol, with the managed device including a network interface, a management agent to manage the networked device in response to a network management packet specifying one or more management functions, and multiple different protocol stacks for receiving network transmissions using multiple different protocols respectively corresponding to the multiple different protocol stacks, the method comprising the steps of:

- obtaining information from the managed device pertaining to the presence and identity of the multiple different protocol stacks;
- transmitting multiple copies of a same network management packet to the same managed device over each of the multiple different protocol stacks;
- receiving a first copy of the same network management packet following a first protocol corresponding to one of the multiple different protocol stacks;
- passing the received first copy of the packet to the corresponding one of the multiple different protocol stacks and thereafter to the management agent;
- processing the received first copy of the packet to execute a management function specified by the received packet;
- receiving a second copy of the same network management packet following a second protocol corresponding to a second one of the multiple different protocol stacks;
- passing the received second copy of the same network management packet to the corresponding second one of the multiple different protocol stacks and thereafter to the management agent; and
- processing the received second copy of the packet to execute the same management function.

18. A method according to claim 17, wherein the step of obtaining information comprises querying the managed device to obtain the information pertaining to the presence and identity of the multiple different protocol stacks.

19. A method according to claim 17, wherein the step of obtaining information comprises obtaining the information pertaining to the presence and identity of the multiple different protocol stacks from a stored table.

20. The method according to claim 17, further comprising determining whether the same network management packet is a device-specific packet or a network management packet.

21. The method according to claim 20, wherein, if the same network management packet is a device-specific packet, a device-specific application corresponding to the packet is executed.

22. An apparatus for managing a networked device by a management client over a network using a network management protocol, with the managed device including a network interface, a management agent to manage the networked device in response to a network management packet specifying one or more management functions, and multiple different protocol stacks for receiving network transmissions using multiple different protocols respectively corresponding to the multiple different protocol stacks, said apparatus comprising means for performing the functions specified in any one of claims 17 to 21.

23. Computer-executable process steps stored on a computer readable medium, said computer-executable process steps for managing a networked device by a management client over a network using a network management protocol, with the managed device including a network interface, a management agent to manage the networked device in response to a network management packet specifying one or more management functions, and multiple different protocol stacks for receiving network transmissions using multiple different protocols respectively corresponding to the multiple different protocol stacks, said computer-executable process steps comprising process steps executable to perform a method according to any of claims 17 to 21.

* * * * *